United States Patent
Loganathan

(10) Patent No.: US 10,078,863 B2
(45) Date of Patent: Sep. 18, 2018

(54) SYSTEMS AND METHODS FOR AUGMENTED REALITY PAYMENTS

(71) Applicant: PAYPAL, INC., San Jose, CA (US)

(72) Inventor: Balu Epalapalli Loganathan, Milpitas, CA (US)

(73) Assignee: PAYPAL, INC., San Jose, CA (US)

( * ) Notice: Subject to any disclaimer, the term of this patent is extended or adjusted under 35 U.S.C. 154(b) by 795 days.

(21) Appl. No.: 14/141,362

(22) Filed: Dec. 26, 2013

(65) Prior Publication Data

US 2015/0186984 A1   Jul. 2, 2015

(51) Int. Cl.
| | |
|---|---|
| G06Q 30/00 | (2012.01) |
| G06Q 30/06 | (2012.01) |
| G06Q 20/12 | (2012.01) |
| G07G 1/01 | (2006.01) |
| G06Q 20/32 | (2012.01) |

(52) U.S. Cl.
CPC ......... G06Q 30/0641 (2013.01); G06Q 20/12 (2013.01); G06Q 20/322 (2013.01); G06Q 30/0639 (2013.01); G07G 1/01 (2013.01)

(58) Field of Classification Search
CPC ................................................. G06Q 30/0641
See application file for complete search history.

(56) References Cited

U.S. PATENT DOCUMENTS

| | | | | |
|---|---|---|---|---|
| 8,606,645 B1* | 12/2013 | Applefeld | ............. | G06Q 30/02 705/14.25 |
| 2003/0173481 A1* | 9/2003 | Tatta | ......................... | G09F 3/20 248/205.3 |
| 2004/0024650 A1* | 2/2004 | Chen | ...................... | G06Q 20/12 705/26.43 |
| 2007/0173266 A1* | 7/2007 | Barnes, Jr. | ......... | G06Q 10/1053 455/456.1 |
| 2010/0287500 A1* | 11/2010 | Whitlow | ................ | G02B 27/01 715/810 |
| 2011/0238517 A1* | 9/2011 | Ramalingam | .......... | G06Q 20/10 705/26.1 |
| 2013/0046648 A1* | 2/2013 | Calman | .................. | G06Q 30/08 705/26.3 |
| 2014/0176348 A1* | 6/2014 | Acker, Jr. | ............. | G08G 1/144 340/932.2 |

OTHER PUBLICATIONS

Misonzhnik, Elaine. "Mall of the Future." Retail Traffic (2010): NA. ProQuest. Web. May 8, 2018. (Year: 2010).*

* cited by examiner

*Primary Examiner* — Lena Najarian
(74) *Attorney, Agent, or Firm* — Haynes and Boone, LLP

(57) ABSTRACT

Systems and methods are provided for augmented reality payments. An augmented reality display may include product information and/or payment information images displayed over an image of one or more real world background objects. The augmented reality display may be displayed on a display of a mobile user device such as a smartphone or tablet or on a structure of a vehicle such as a vehicle windshield. The real world background objects may include a merchant store. The product information and/or the payment information may be overlaid on the merchant store as viewed through a vehicle windshield or as viewed in an image of the merchant store captured by a camera of the user device. The user may be provided with the ability to select one or more items for purchase, make one or more payments, or execute other transactions by interacting with the augmented reality display.

16 Claims, 8 Drawing Sheets

SYSTEMS AND METHODS FOR AUGMENTED REALITY PAYMENTS

BACKGROUND

Field of the Invention

The present invention generally relates to electronic commerce and, more particularly, to systems and methods for facilitating online payments using augmented reality displays.

Related Art

Computer systems and networks can facilitate the tasks of buying, selling and transferring goods and services in retail and other marketplaces. For example, a consumer can pay for an item from either an online merchant or at a point of sale of a brick-and-mortar store through the use of a payment provider that can be accessed on his or her smart phone, tablet, laptop computer, desktop computer, or other personal mobile or desktop device. In particular, users of a payment provider can use the payment provider website or a payment provider application or "app" on a mobile device to make payments to various online or offline merchants.

Augmented reality systems such as augmented reality applications on mobile phones commonly use a device display to present a user with the location or a review of a business in the vicinity of the user, sometimes overlaid on an image of the user's surroundings captured by a camera in the phone. These systems can help a user locate a business by displaying the business name overlaid on a real time image of the business using location sensors in the mobile phone.

However, the user must still traverse the distance to the business, and enter the business in order to purchase products from the business. Conventional augmented reality systems therefore fail to utilize the power of electronic commerce.

It would therefore be desirable to be able to provide improved augmented reality systems that facility shopping and payments.

Figure 1:
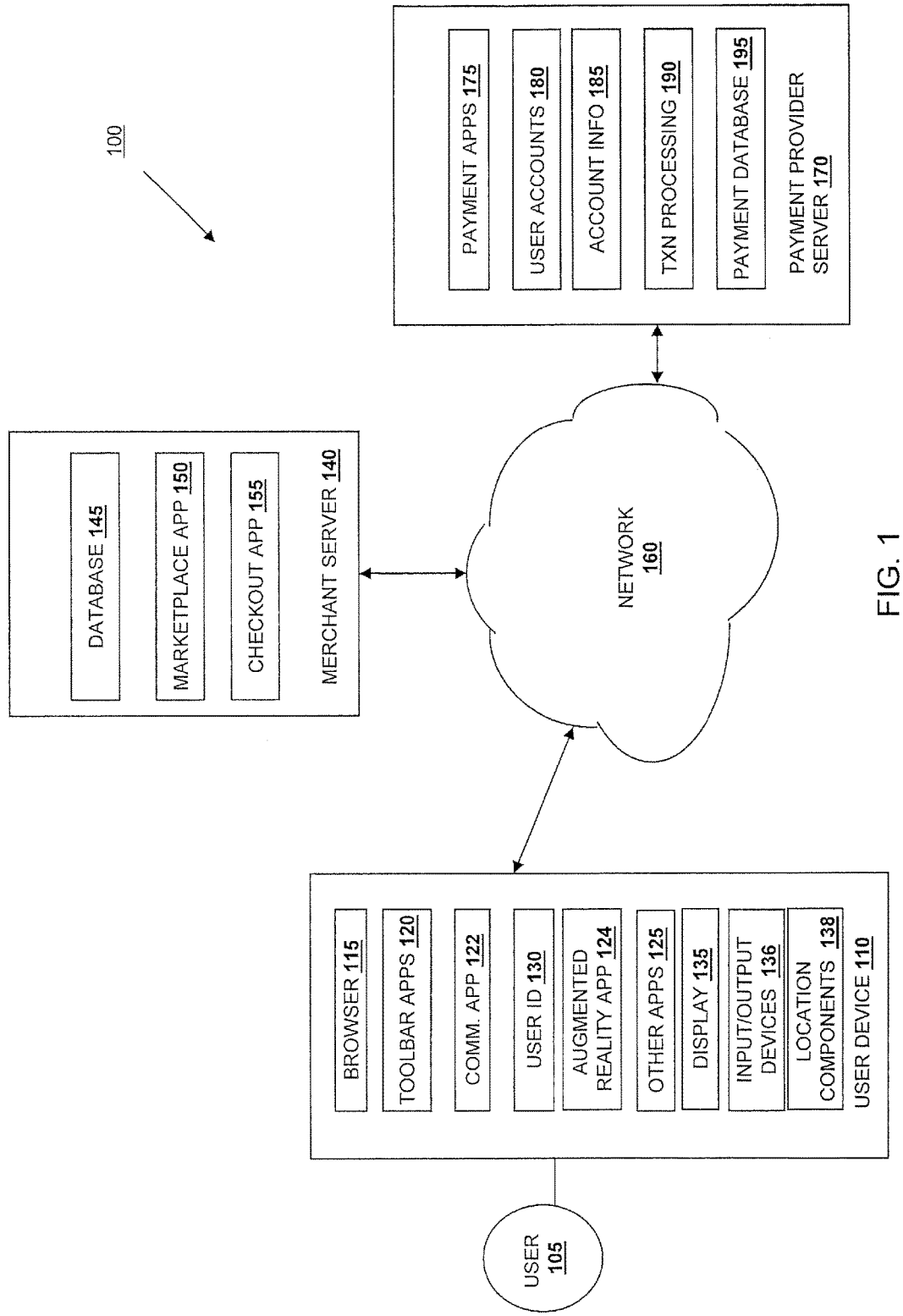
FIG. 1 is a block diagram of an illustrative networked system suitable for implementing a process for facilitating augmented reality transactions according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used, and changes may be made without departing from the spirit and scope of the invention.

Devices, systems and methods are provided for performing activities related to online transactions such as electronic commerce transactions using augmented reality. In various particular embodiments, the devices, systems or methods can involve one or more devices in communication over a network. Such devices, systems, and methods can facilitate the execution of partially or completely online transactions using augmented reality displays. According to an embodiment, an augmented reality display on a user device may overlay augmented reality information such as one or more items for purchase and a payment option such as a one-click virtual payment button on an image of the user's surroundings.

The image of the user's surroundings may be captured by a camera of the device and provided to an opaque device display for overlay of the augmented reality information or the augmented reality information may be displayed on a substantially transparent display that allows the user to directly view their surroundings through the display and, if desired, through a portion of partially transparent augmented reality information (as examples). The augmented reality information may be displayed when the user is near or approaching a particular merchant.

According to an embodiment, the augmented reality information may be displayed on a structure of the user's vehicle such as the vehicle windshield, a vehicle side window, a vehicle visor, a vehicle mirror, or the back of a seat in the vehicle (as examples). Augmented reality information that is displayed on a portion of a vehicle may be displayed based on the vehicle's status. For example, augmented reality information that is provided to the driver on the vehicle windshield may be provided only when the vehicle is stationary or moving at less than a predetermined speed.

Items offered for sale in an augmented reality display may include items suggested by a particular merchant and/or items selected by the user or a user contact. For example, a merchant may provide an offer for discounted merchandise to all drivers having the augmented reality system that pass within a predetermined distance (e.g., one mile) of the merchant location. In another example, a user's spouse, friend, or family member can make a shopping list that can be displayed on the user's windshield and purchased using, for example, a one-click payment button displayed on the windshield that allows the driver to pay for the items using default payment information such as a default funding source. The driver can then drive to the merchant and pick up the prepaid items or the prepaid items can be delivered (e.g., to a default shipping address associated with the one-click purchase button).

The augmented reality display may be generated by, for example, a payment provider application running on the user's mobile device or on computing equipment in the user vehicle.

While the various examples disclosed herein focus on particular aspects regarding the online transactions, it will be understood that the various inventive principles and embodiments disclosed herein can be applied to other types of transactions and arrangements as well. For example, a purchase that is performed in person using an online payment provider for payment may utilize one or more of the aspects and features found in the various systems and methods provided.

Reference throughout the specification to "various embodiments," "some embodiments," "one embodiment," "an embodiment," "various examples," "one example," "an example," or "some examples" means that a particular feature, structure, or characteristic described in connection with the embodiment or example is included in at least one embodiment. Thus, appearances of these are not necessarily all referring to the same embodiment. Furthermore, the particular features, structures or characteristics may be combined in any suitable manner in one or more embodiments.

According to an embodiment, a computer program product can comprise a non-transitory machine readable medium. The non-transitory machine readable medium can have computer readable and executable code for instructing one or more processors to perform any of the methods disclosed herein.

Beginning with FIG. 1, a block diagram is shown of a networked system 100 suitable for implementing a process for facilitating a payment and/or purchase using augmented reality according to an embodiment. Networked system 100 may comprise or implement a plurality of servers and/or software components that operate to perform various electronic commerce transactions or processes such as payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchant server 140, and a payment provider server 170 in communication over a network 160. Payment provider server 170 may be maintained by a payment service provider, such as PayPal, Inc. of San Jose, Calif. A user 105, such as a sender or consumer, utilizes user device 110 to perform a transaction such as an electronic commerce transaction using payment provider server 170. A user 105 may utilize user device 110 to initiate a payment transaction, receive a transaction approval request, or reply to the request. Note that transaction, as used herein, refers to any suitable action performed using the user device, including payments, transfer of information, display of information, purchases, sales, online listings, etc. For example, user 105 may utilize user device 110 to initiate a deposit into a savings account. Although only one merchant server is shown, a plurality of merchant servers may be utilized if the user is purchasing products or services from multiple merchants.

User device 110, merchant server 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, personal digital assistant (PDA), laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may include an augmented reality application 124. Augmented reality application 124 may be used to receive product information, price information, merchant information or other information from payment provider server 170 and/or merchant server 140. Augmented reality application 124 may provide augmented reality information such as items for sale and/or payment options to display 135 for display to a user in an augmented reality display.

Augmented reality application 124 may receive device location information and/or device orientation information from location components 138 (e.g., a global positioning system (GPS) component, one or more accelerometers, a compass, WiFi devices, Near-Field Communication (NFC) devices, etc.). The location information may include GPS coordinates, accelerometer data that indicates an orientation of the device and/or movement of the device or other data that indicates the location, position, and/or orientation of the device. User device 110 may determine a current location of user device 110 based on the collected location data. In another embodiment, user device 110 may send the location data to payment provider server 170 and payment provider server 170 may determine a current location of user device 110 based on the location data. The augmented reality information displayed by display 135 in response to instructions from augmented reality application 134 may include content that is based on the location information and/or may be displayed a time or at a location on display 135 based on the location information.

User device 110 may include one or more input/output devices 136 (e.g., a keypad, a keyboard, a touch sensitive component, or a camera). For example, input/output devices 136 may include a camera that provides images of background objects (e.g., a continuous video stream of a scene in the field of view of the camera) to augmented reality application 124 that can be displayed on display 135 with augmented reality information overlaid on the camera images.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise utilize a smart wallet through the payment provider as discussed above. User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

Display 135 may include a touch screen that displays information to user 105 and receives user input from user 105 or display 135 may be a touch insensitive display. Display 135 may be a mobile device display, a projection display that projects images onto a transparent, partially transparent or opaque structure, or may include any other suitable display technology. User device 110 may monitor user input on the touch screen, on any other touch-sensitive device (e.g., a touchpad on a laptop), or using other input components (e.g., a mouse) and may recognize user input for association with transactions, and/or to activate certain functions (e.g., purchase transactions, payment transactions, sales transactions, and listing transactions) based on the displayed augmented reality information.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as banks and retailers. For example, a payment may be a donation to charity or a deposit to a bank account such as a savings account.

Merchant server 140 may include a database 145 identifying available products (including digital goods) and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online (e.g., in an augmented reality system) or at a physical POS or store front. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 includes one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. Payment application 175 may be configured to interact with merchant server 140 on behalf of user 105 during a transaction with checkout application 155 to track and manage purchases made by users and which and when funding sources are used. Payment application 175 may be configured to determine the existence of and to manage accounts for user 105, as well as create new accounts if necessary. Payment application 175 may be configured to execute one or more payment transactions in response to receiving and recognizing a drawn pattern from user 105.

A transaction processing application 190, which may be part of payment application 175 or may be separate from application 175, may be configured to receive information from user device 110 and/or merchant server 140 for processing and storage in a payment database 195. Transaction processing application 190 may include one or more applications for processing information from user 105 for processing an order and for payment using various selected funding instruments, including operations for initial purchase and for payment after purchase as described herein. As such, transaction processing application 190 may store details of an order from individual users, including a funding source used, available credit options, etc. Transaction processing application 190 may be configured to execute one or more transactions such as electronic commerce transactions in response selection of a transaction option in an augmented reality display from user 105.

One or more of merchant server 140, payment provider server 170, and user device 110 may be used to execute any suitable transaction in response to receiving augmented reality transaction instructions from a user.

Figure 2:
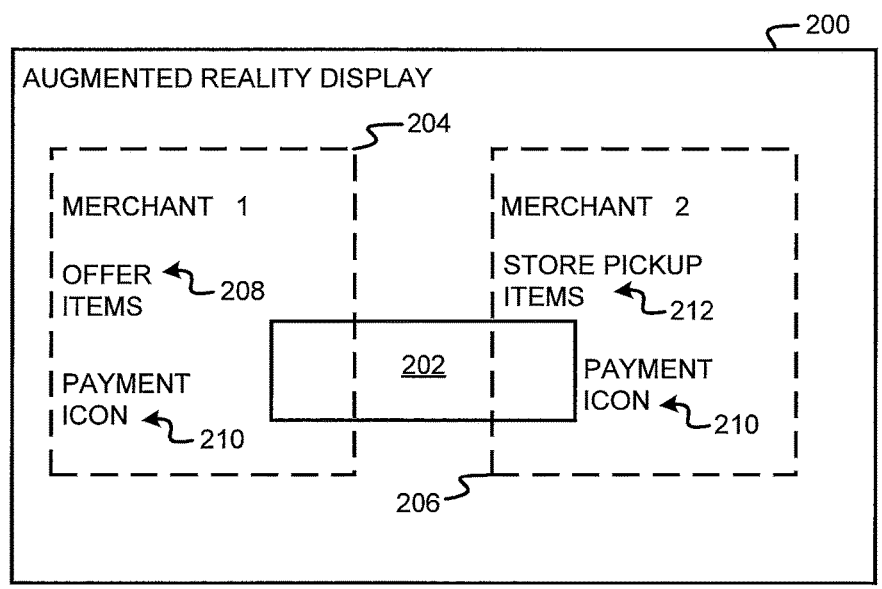
FIG. 2 is a diagram of an illustrative augmented reality display showing how a user may be provided with items for purchase and payment options in the augmented reality display according to an embodiment.

FIG. 2 shows an example of an augmented reality display in accordance with an embodiment. Augmented reality display 200 may be displayed on a display component of a user device, on a structure of a vehicle (e.g., an automobile, a bus, a train, an airplane, a cruise ship) or other locations or structures on which augmented reality information can be overlaid or displayed proximal to images of real life background objects or to the background objects themselves.

As shown in FIG. 2, an augmented reality display may include augmented reality information such as augmented reality information 204 and 206 overlaid on one or more background objects such as background object 202. Augmented reality information 204 and 206 may be partially transparent images that allow a user to see some or all of background objects 202 through information 204 and 206 and/or portions of augmented reality information 204 and/or 206 may be opaque, thereby blocking the user's view of background object 202.

Augmented reality information 204 and 206 may include various images corresponding to products, merchants, and/or payments (as examples). In the example of FIG. 2, augmented reality information 204 includes a name of a merchant (e.g., "merchant 1"), offer items 208 from the merchant, and a payment icon 210. Offer items 208 may be merchant-recommended items such as sale items, discounted items, limited availability items or other items offered by merchant 1. Merchant 1 may be a merchant that the user has previously purchased items from, a merchant that is visible behind augmented reality information 204, or a merchant that is nearby the user (e.g., within a mile, within a half mile, within 10 miles, or within any other suitable distance).

Payment icon 210 of augmented reality information 204 may be a virtual payment button of a payment server such as payment server 170 that, when selected (e.g., clicked using, for example, a user's finger or other selection device) causes payment to be made to the merchant (e.g., merchant 1) for offer items 208. Payment icon 210 may, for example, be a one-click payment icon.

Augmented reality information 206 may include a name of another merchant (e.g., "merchant 2"), store pickup items 212, and a payment icon 210. Store pickup items 212 may be items selected by the user and/or items chosen by a contact of the user such as a user's family member, friend or other contact. In one usage scenario, a user's spouse may select (e.g., on a website or application of merchant 2) one or more items for store pickup by the user. The store pickup items may be transmitted to augmented reality display 200 and displayed for the user along with payment icon 210. The user can then click the payment icon to pay for the store pickup items and then pick up the items at the merchant. In this way, item selection, shopping, and payment can be completed prior to the arrival of the user at the merchant location. Merchant 2 may be a merchant that the user has previously purchased items from, a merchant that is visible behind augmented reality 204, or a merchant that is nearby the user (e.g., within a mile, within a half mile, within 10 miles, or within any other suitable distance) or any other merchant associated with augmented reality application 124 and/or payment server 170.

Augmented reality display 200 may be generated on user device display by an augmented reality application such as augmented reality app 124 of FIG. 1. In one embodiment, background object 202 may an image of a real world background object captured by a camera of the user device and reproduced at the location of the user's view of the real world object on the device display. According to another embodiment, background object 202 may be a real life view of a real world background object viewed through a partially or completely transparent display structure such as plastic or glass.

In one suitable configuration that is sometimes discussed herein as an example, augmented reality display 200 may be displayed on a structure of a vehicle. An exemplary embodiment of this type of configuration is shown in FIG. 3.

Figure 3:
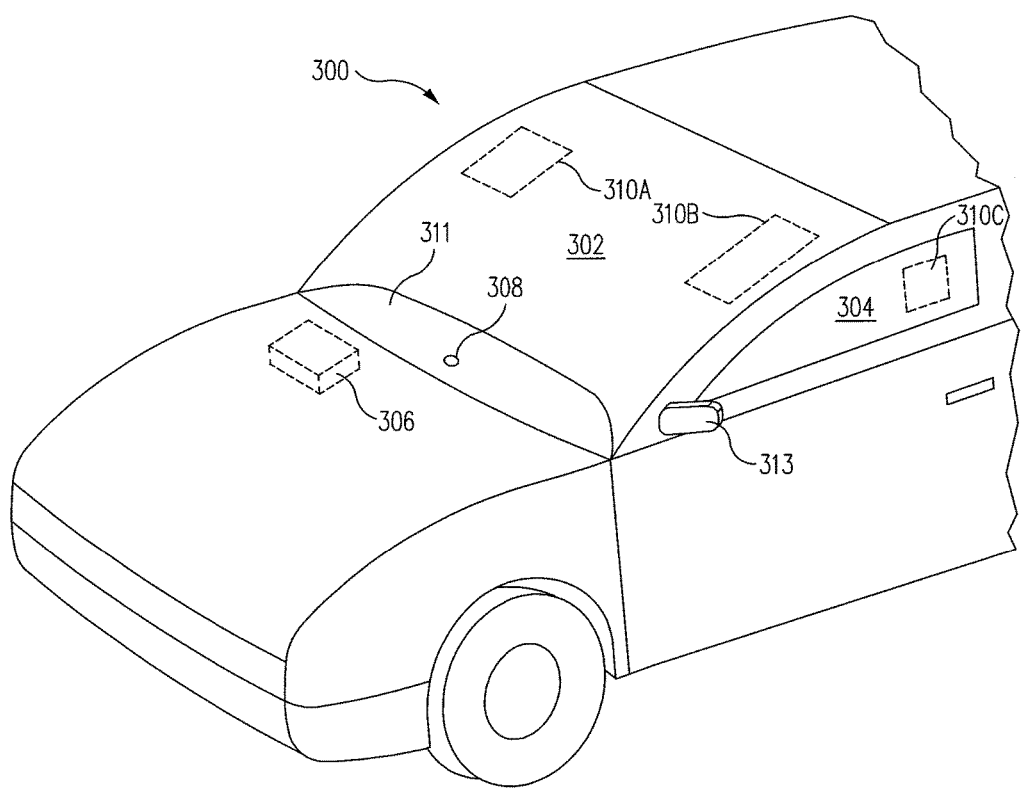
FIG. 3 is a diagram of a portion of an illustrative vehicle having an augmented reality display system incorporated in the vehicle according to an embodiment.

As shown in FIG. 3, a vehicle such as vehicle 300 may, at selected times, have augmented reality information such as augmented reality information 310A, 310B, and/or 310C displayed one or more vehicle structures. For example, augmented reality information 310A and 310B may be displayed on the vehicle windshield 302. Augmented reality information 310C may be displayed on another vehicle structure such as side window 304, dashboard 311, mirror 313 or other vehicle structures such as a seat in the vehicle (e.g., on the backside of a front seat to be viewed by a passenger in a rear vehicle seat). Augmented reality information 310A, 310B, and/or 310C may include any or all of the augmented reality information described above in connection with FIG. 2.

Augmented reality information 310A, 310B, and/or 310C may be displayed to a vehicle passenger or driver using display components embedded in the vehicle structure (e.g., the windshield 302 and/or the side window 304 may be partially transparent touch screen displays) or projected onto the vehicle structure by a projector such as projector 308.

Vehicle 300 may include computing equipment such as computing equipment 306. Computing equipment 306 may be used to send and receive information from a merchant server and/or a payment server, display information on vehicle structures, receive user input such as a selection of items displayed in information 310A, 310B, and/or 310C or a payment instruction from a driver or other vehicle passenger using a payment icon in information 310A, 310B, and/or 310C or to perform other computing operations for vehicle 300 and/or an augmented reality payment and purchase system in vehicle 300.

Figure 4:
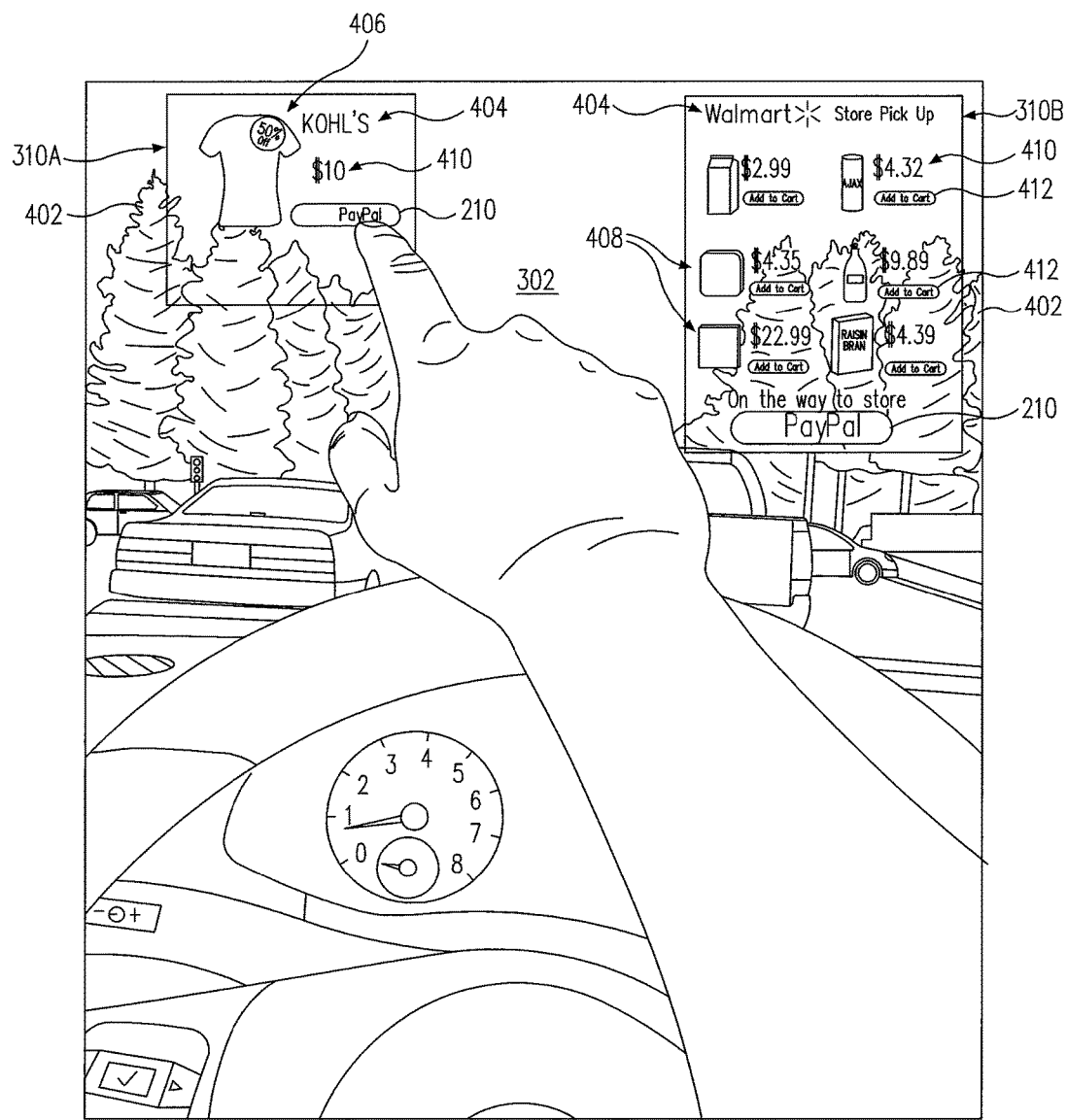
FIG. 4 is a diagram of an illustrative vehicle windshield showing how augmented reality information including items for purchase and payment options may be displayed on the windshield according to an embodiment.

FIG. 4 is a diagram of a portion of vehicle windshield 302 as viewed by a driver of the vehicle from within the vehicle during operation of a vehicle augmented reality system according to an embodiment. As shown in FIG. 4, augmented reality information 310A and 310B may be displayed on windshield 302 such that background objects 402 (e.g., trees, stop lights, stop signs, other vehicles, road signs, businesses, buildings, or other objects that may be viewed from a vehicle) are visible to the driver proximal to and/or behind augmented reality information 310A and/or 310B.

As shown in FIG. 4, augmented reality information 310A that may be displayed on windshield 302 (or on an image of a background object on a mobile device display) may include product information such as an image of a product 406 (e.g., a t-shirt), a merchant name 404 (e.g., Kohl's®), a price 410, and payment information such as payment icon 210 (e.g., a payment icon of PayPal, Inc. of San Jose, Calif.). As shown, a product image such as product image 406 may include a discount notification (e.g., a "50% off" notification). Product information 404, 406, and 410 may be provided based on a relative location of merchant 404 and the vehicle. For example, computing equipment 306 may be used to determine the location of the vehicle, determine the relative location of the merchant, and display the product information when the distance between the merchant and the vehicle (or any other user device) is less than a predetermined distance.

Augmented reality information 310B that may be displayed on windshield 302 (or on an image of a background object on a mobile device display) may include product information such as images of products 408, a merchant name 404 (e.g., Walmart®), a price 410 associated with each product, a product selection icon 412 (e.g., an "Add to Cart" icon associated with each product image 408) and payment information such as payment icon 210. As shown, a driver or a passenger in the vehicle or another observer of an augmented reality display having product information and payment information may provide product selection information and/or payment instructions by clicking or otherwise selecting product selection icon 412 and/or payment icon 210 (e.g., with the user's finger as shown or with any other suitable selection device capable of interacting with a display such as windshield 302).

Products 408 may have been selected by (as examples) the user prior to entering the vehicle or by a contact of the user (e.g., the user's spouse, partner, friend, family member, or other contact). Computing equipment associated with the display (e.g., computing equipment 306) may receive the selected products (e.g., from the user contact) and display the products on the user's windshield as the products are selected, when the user contact initiates sending of the products, or when the vehicle moves toward or enters within a predetermined distance of a merchant.

Figure 5:
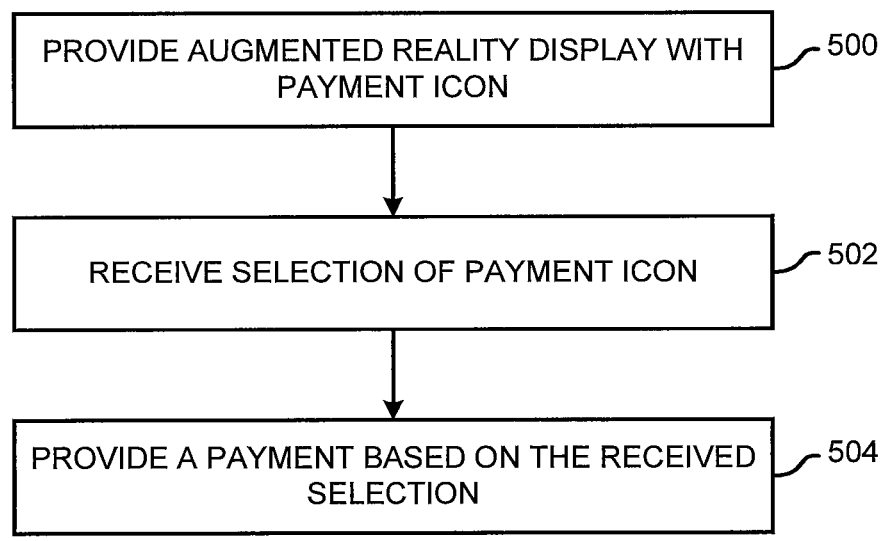
FIG. 5 is a flowchart showing an illustrative process for providing a user with the ability to make augmented reality payments according to an embodiment.

FIG. 5 is a flowchart showing a process for providing a user with the ability to make payments using an augmented reality display according to an embodiment.

At step 500, an augmented reality display with payment information such as a payment icon may be displayed to the user. The augmented reality display may include product information and/or payment information that can be viewed and selected by the user. The augmented reality display may include a display of the product information and/or the payment information overlaid on an image of a background object. The image of the background object may be an image of the background object captured by a camera in a user device and displayed on a display of the user device behind the product information or may be a directly viewed image of the background object through a partially or completely transparent structure such as a vehicle window.

At step 502, payment instructions may be received from the user via the augmented reality display (e.g., by selection of a payment icon in the augmented reality display by the user).

At step 504, a payment may be provided (e.g., to a merchant) based on the received payment information (e.g., the received selection of the payment icon by the user).

Figure 6:
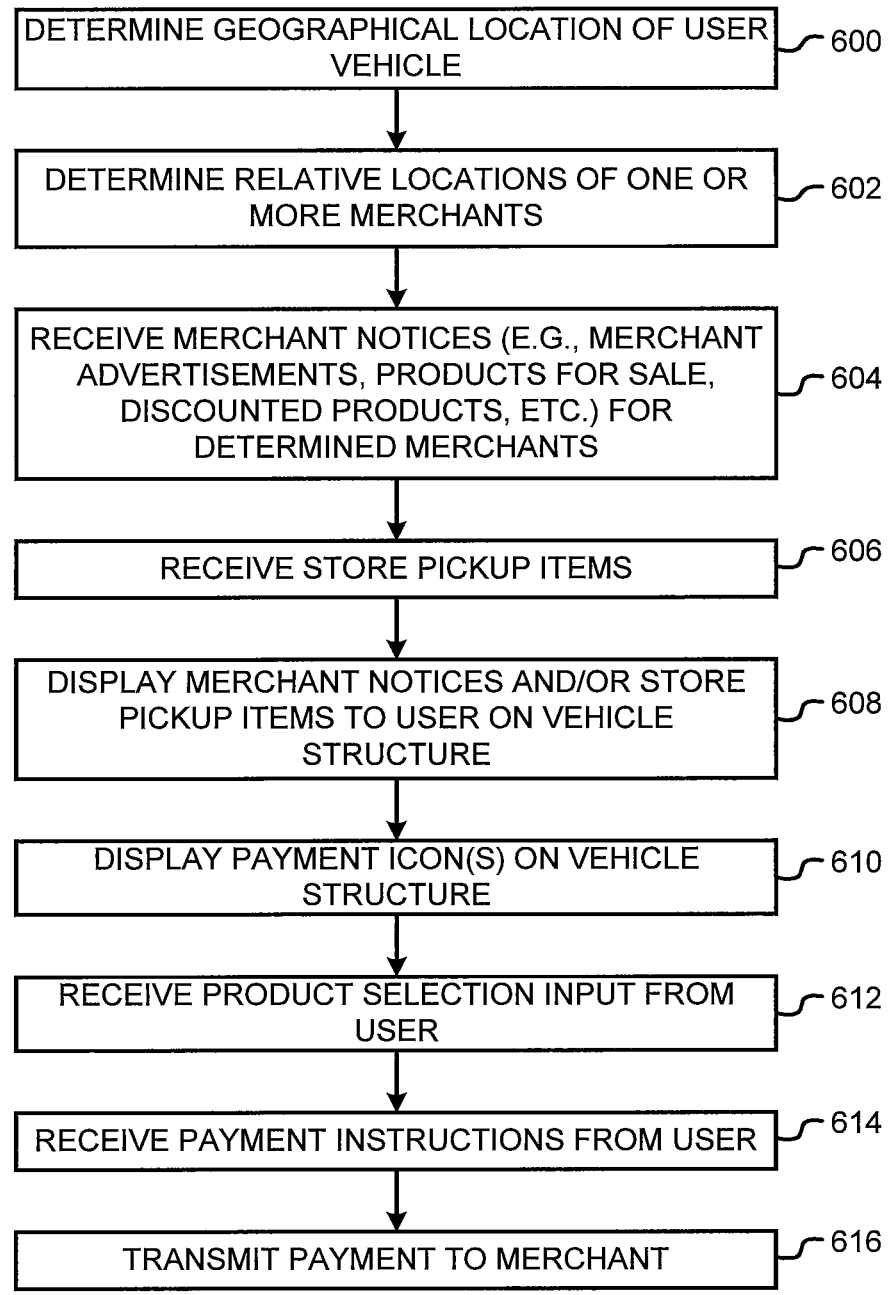
FIG. 6 is a flowchart showing an illustrative process for using a vehicle structure to provide a user with an augmented reality display according to an embodiment.

As described herein, in some configurations, portions of a vehicle can be used to provide an augmented reality display to a user that allows the user to make purchases and/or payments. FIG. 6 is a flowchart of an illustrative process for operating an augmented reality display in a user vehicle.

At step 600, a geographical location of the user vehicle may be determined (e.g., using global positioning system data, WiFi data, near field communications NFC data, compass data, or other location data).

At step 602, the relative locations of one or more merchants such as merchants within a predetermined distance of the determined location of the vehicle may be determined with respect to the determined vehicle location.

At step 604, one or more merchant notices (e.g., merchant advertisements, products for sale, discounted products, etc.) may be received for the determined merchants.

At step 606, one or more store pickup items may be received. The store pickup items may be received, for example, from a user contact.

At step 608, product information such as the merchant notices and/or the store pickup items may be displayed to the user on a vehicle structure (e.g., a vehicle window, windshield, mirror, seat, seatback, side window, door, or other structure) in an augmented reality display.

At step 610, one or more payment icons associated with the merchant notices and/or the store pickup items may be displayed in the augmented reality display. The payment icons may, for example, be one-click payment icons.

At step 612, one or more product selections may be received from the user. The product selections may be received when, for example, the user selects one or more product images or "Add to Cart" icons in the augmented reality display.

At step 614, payment instructions may be received from the user (e.g., when the user selects the display payment icon(s) in the augmented reality display).

At step 616, a payment may be transmitted to a merchant (e.g., from a user account of the user by a payment provider server) in response to receiving the payment instructions.

Figure 7:
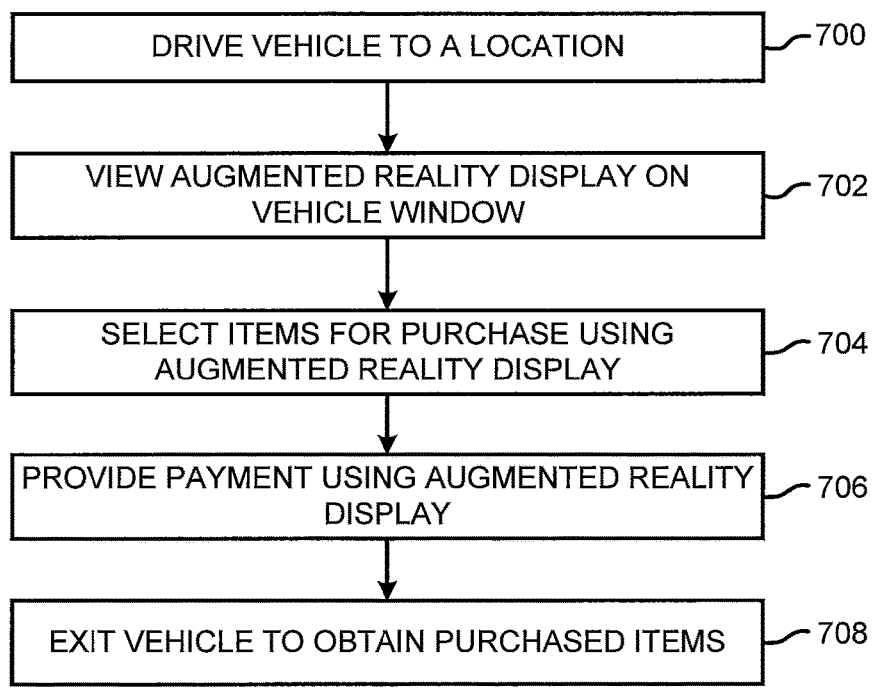
FIG. 7 is a flowchart showing an illustrative process for shopping with a vehicle structure augmented reality display according to an embodiment.

Providing store pickup items to a user in a vehicle (e.g., a driver) as described herein may help reduce the time it takes for a shopper to select and pick up products from a merchant. FIG. 7 is a flowchart of a process for purchasing items for pickup in one exemplary usage scenario for a user according to an embodiment.

At step 700, a vehicle may be driven by a user (e.g., a driver) to a location such as a merchant location (e.g., a brick-and-mortar store of the merchant).

At step 702, an augmented reality display may be viewed on a vehicle structure such as a vehicle window. The augmented reality display may include products that are for sale at the merchant such as products that have been preselected by the user or a user contact. The augmented reality display may be viewed at a time when the vehicle is en route to the merchant (e.g., at a stop light or a stop sign when the vehicle is not moving or is moving less than a predetermined speed) or when the user has parked at the merchant location. In one embodiment, the augmented reality display may include product information and/or payment information displayed on, over, below, or otherwise overlaid on or proximal to the merchant location itself. For example, an item for sale at a grocery store may be displayed overlaid on the grocery store itself as viewed through the vehicle windshield. The item for sale may remain overlaid on the grocery store even as the vehicle moves or turns by moving the location on the windshield at which the item for sale is displayed based on the location of the vehicle and the relative location of the merchant.

At step 704, the user may select one or more items for purchase using the augmented reality display.

At step 706, the user may provide payment to the merchant using the augmented reality display (e.g., by clicking a one-click or other payment icon that is included in the augmented reality display). A payment provider server may transfer funds from an account (e.g., a bank account, a credit card account, or other financial account) of the user to an account of the merchant in response to receiving the user's selection of the payment icon in the augmented reality display.

At step 708, the user may exit the vehicle to obtain the items purchased and paid for using the augmented reality display.

In general, the steps described above in connection with FIGS. 5, 6, and/or 7 may be performed in any suitable order and/or combined in any suitable way for executing transaction operations involving augmented reality.

Figure 8:
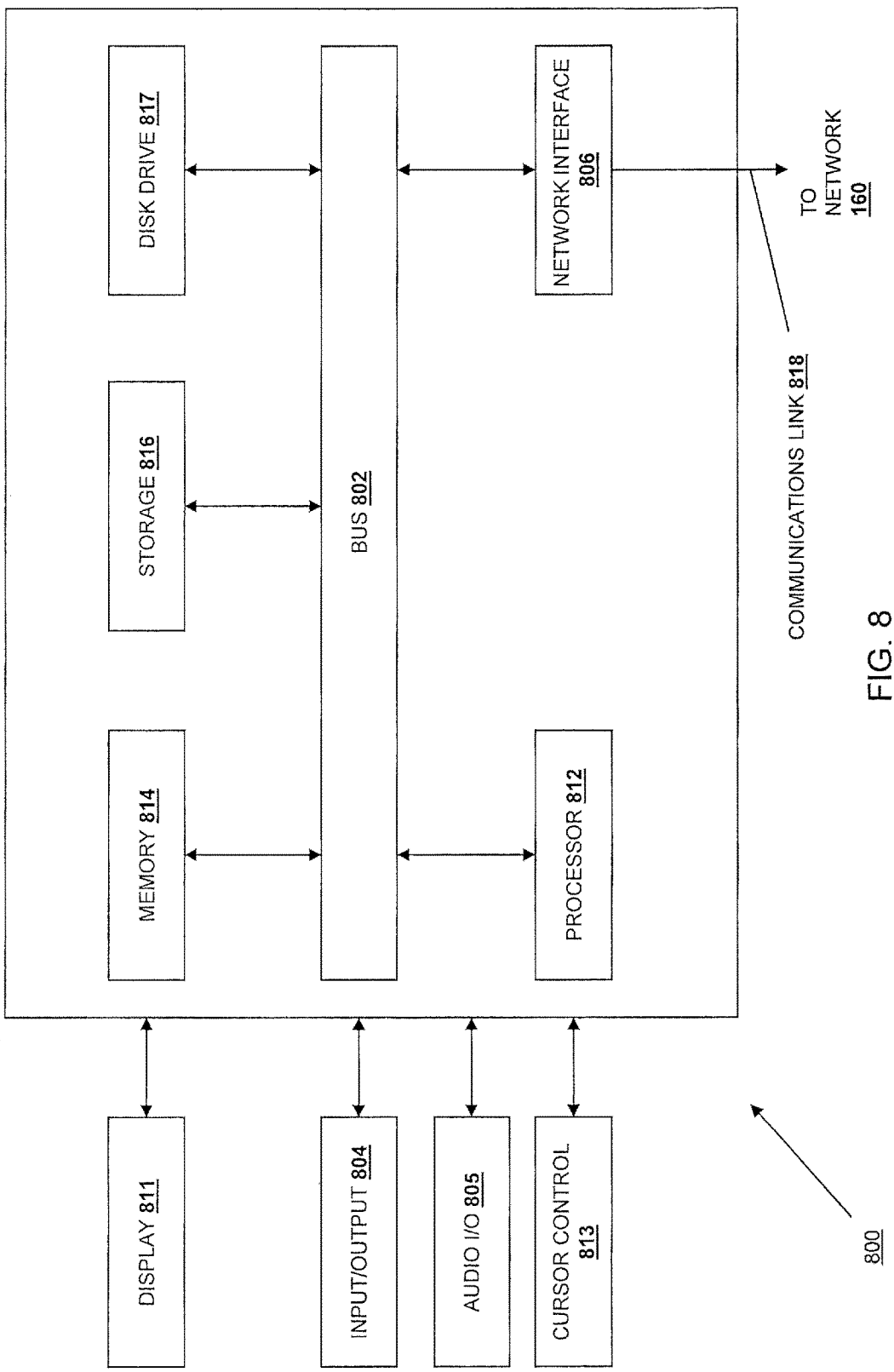
FIG. 8 is a block diagram of an illustrative computer system suitable for implementing one or more components in FIG. 1 according to an embodiment.

FIG. 8 is a block diagram of a computer system 800 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 800 in a manner as follows.

Computer system 800 includes a bus 802 or other communication mechanism for communicating information data, signals, and information between various components of computer system 800. Components include an input/output (I/O) component 804 that processes a user action, such as selecting keys from a keypad/keyboard, selecting one or more buttons or links, etc., and sends a corresponding signal to bus 802. I/O component 804 may also include an output component, such as a display 811 and a cursor control 813 (such as a keyboard, keypad, mouse, etc.). An optional audio input/output component 805 may also be included to allow a user to use voice for inputting information by converting audio signals. Audio I/O component 805 may allow the user to hear audio. A transceiver or network interface 806 transmits and receives signals between computer system 800 and other devices, such as another user device, a merchant server, or a payment provider server via network 160. In one embodiment, the transmission is wireless, although other transmission mediums and methods may also be suitable. A processor 812, which can be a micro-controller, digital signal processor (DSP), or other processing component, processes these various signals, such as for display on computer system 800 or transmission to other devices via a communication link 818. Processor 812 may also control transmission of information, such as cookies or IP addresses, to other devices.

Components of computer system 800 also include a system memory component 814 (e.g., RAM), a static storage component 816 (e.g., ROM), and/or a disk drive 817. Computer system 800 performs specific operations by processor 812 and other components by executing one or more sequences of instructions contained in system memory component 814. Logic may be encoded in a computer readable medium, which may refer to any medium that participates in providing instructions to processor 812 for execution. Such a medium may take many forms, including but not limited to, non-volatile media, volatile media, and transmission media. In various implementations, non-volatile media includes optical or magnetic disks, volatile media includes dynamic memory, such as system memory component 814, and transmission media includes coaxial cables, copper wire, and fiber optics, including wires that comprise bus 802.

In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 800. In various other embodiments of the present disclosure, a plurality of computer systems 800 coupled by communication link 818 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. An augmented reality system of a vehicle, comprising:
   a non-transitory memory storing account information of a user;
   a location determination device configured to determine location information of the vehicle;
   a display structure of the vehicle comprising at least one of a mirror, a windshield, a side window, or a vehicle seat; and one or more hardware processors configured to execute instructions to perform operations comprising:
receiving product information in response to a second user selecting a product associated with the product information;
receiving payment information;
receiving the location information for the vehicle from the location determination device;
displaying the product information and the payment information on the display structure of the vehicle in an augmented reality display to the user in response to the location information identifying the vehicle as being parked at a location of a merchant, the displaying being such that the product information and the payment information are overlaid on an image associated with the merchant as viewed through the augmented reality display;
receiving payment instructions responsive to a touch selection from the user through the display structure; and
sending a payment to the merchant responsive to the payment instructions.

2. The system of claim 1, wherein the display structure is configured to display the product information and the payment information in the augmented reality display to the user.

3. The system of claim 1, wherein the display structure comprises the mirror.

4. The system of claim 1, wherein the display structure comprises the windshield.

5. The system of claim 1, wherein the display structure comprises the side window.

6. The system of claim 1, wherein the display structure comprises the vehicle seat.

7. The system of claim 1 wherein the operations further comprise:
determining a speed of the vehicle; and
removing display of the product information and the payment information in the augmented reality display when the speed is above a threshold speed.

8. A method, comprising:
receiving, electronically by one or more processors, product information for a user in a vehicle, in response to a second user selecting a product associated with the product information;
receiving, electronically by the one or more processors, payment information;
receiving, electronically by the one or more processors, location information for the vehicle from a location determination device;
displaying, electronically by the one or more processors on a display structure of the vehicle, the product information and the payment information in an augmented reality display to the user in response to the location information identifying the vehicle as being parked at a location of a merchant, the displaying being such that the product information and the payment information are overlaid on an image associated with the merchant as viewed through the augmented reality display, wherein the display structure comprises at least one of a mirror, a windshield, a side window of the vehicle, or a vehicle seat;
receiving, electronically by the one or more processors, payment instructions responsive to a touch selection from the user through the display structure; and
sending, electronically by the one or more processors, a payment to the merchant responsive to the payment instructions.

9. The method defined in claim 8, wherein the displaying comprises moving a location of the product information and/or the payment information to stay overlaid on the image associated with the merchant in response to the vehicle moving.

10. The method defined in claim 9, further comprising:
capturing an image of a background object; and
displaying the image of the background object on a display of a user device.

11. The method defined in claim 9, wherein the display structure comprises a transparent structure, the method further comprising:
displaying, for the payment information overlaid on the image associated with the merchant, images corresponding to the product information and the payment information on the transparent structure that allows the user to view a background object directly through the transparent structure and through a portion of the product information and the payment information.

12. The method defined in claim 11, wherein the transparent structure comprises the side window of the vehicle.

13. The method defined in claim 12, further comprising:
determining the location information of the vehicle;
determining a relative location of the merchant with respect to the vehicle; and
displaying images corresponding to the product information and the payment information at a time that depends on the location information of the vehicle and the relative location of the merchant.

14. The method defined in claim 12, wherein the receiving of the product information comprises receiving the product information from the merchant.

15. The method defined in claim 12, wherein the receiving of the product information comprises receiving product selections from a contact of the user.

16. The method defined in claim 15, further comprising providing products corresponding to the product selections to the user at a location of the merchant.

* * * * *